United States Patent
Russell et al.

(10) Patent No.: US 11,048,927 B2
(45) Date of Patent: Jun. 29, 2021

(54) PEDESTRIAN BEHAVIOR PREDICTIONS FOR AUTONOMOUS VEHICLES

(71) Applicant: Waymo LLC, Mountain View, CA (US)

(72) Inventors: Jared Stephen Russell, San Francisco, CA (US); Kai Ding, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 450 days.

(21) Appl. No.: 15/791,602

(22) Filed: Oct. 24, 2017

(65) Prior Publication Data

US 2019/0122037 A1    Apr. 25, 2019

(51) Int. Cl.
| | |
|---|---|
| *G06K 9/00* | (2006.01) |
| *B60W 30/095* | (2012.01) |
| *G08G 1/16* | (2006.01) |
| *G05D 1/02* | (2020.01) |
| *G05D 1/00* | (2006.01) |

(52) U.S. Cl.
CPC ..... *G06K 9/00362* (2013.01); *B60W 30/0956* (2013.01); *G05D 1/0088* (2013.01); *G05D 1/0214* (2013.01); *G05D 1/0276* (2013.01); *G06K 9/00369* (2013.01); *G06K 9/00805* (2013.01); *G08G 1/166* (2013.01); *G05D 2201/0213* (2013.01); *G06T 2207/30196* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 6,393,370 B1* | 5/2002 | Soika | G01S 7/52004 702/104 |
| 9,104,965 B2 | 8/2015 | Fritsch et al. | |
| 2007/0288133 A1 | 12/2007 | Nishira et al. | |
| 2010/0010699 A1* | 1/2010 | Taguchi | G08G 1/167 701/23 |

(Continued)

FOREIGN PATENT DOCUMENTS

| | | |
|---|---|---|
| EP | 2961644 A1 | 1/2016 |
| JP | 2010173616 A | 8/2010 |

(Continued)

OTHER PUBLICATIONS

International Search Report and Written Opinion for Application No. PCT/US2018/057071 dated Feb. 1, 2019.

(Continued)

*Primary Examiner* — Nicholas K Wiltey
(74) *Attorney, Agent, or Firm* — Botos Churchill IP Law

(57) ABSTRACT

The technology relates to controlling a vehicle in an autonomous driving mode. For instance, sensor data identifying an object in an environment of the vehicle may be received. A grid including a plurality of cells may be projected around the object. For each given one of the plurality of cells, a likelihood that the object will enter the given one within a period of time into the future is predicted. A contour is generated based on the predicted likelihoods. The vehicle is then controlled in the autonomous driving mode in order to avoid an area within the contour.

20 Claims, 16 Drawing Sheets

(56) References Cited

U.S. PATENT DOCUMENTS

| | | | |
|---|---|---|---|
| 2010/0305858 A1* | 12/2010 | Richardson | G06K 9/00785 |
| | | | 701/301 |
| 2011/0238309 A1* | 9/2011 | Tsunekawa | B60R 21/0134 |
| | | | 701/301 |
| 2013/0345968 A1 | 12/2013 | Hartman | |
| 2015/0210311 A1* | 7/2015 | Maurer | B62D 6/00 |
| | | | 701/41 |
| 2015/0367848 A1 | 12/2015 | Terashima | |
| 2016/0355181 A1 | 12/2016 | Morales Teraoka et al. | |
| 2017/0057497 A1* | 3/2017 | Laur | G06K 9/00348 |
| 2017/0109644 A1 | 4/2017 | Nariyambut Murali et al. | |
| 2017/0120814 A1* | 5/2017 | Kentley | B60Q 5/008 |
| 2017/0259814 A1 | 9/2017 | Fujimura et al. | |
| 2017/0372612 A1* | 12/2017 | Bai | G08G 1/161 |
| 2018/0217603 A1 | 8/2018 | Kwon et al. | |
| 2019/0331485 A1* | 10/2019 | Moriguchi | G01S 5/0294 |
| 2019/0333386 A1* | 10/2019 | Horita | B60W 30/0956 |
| 2020/0150665 A1* | 5/2020 | Refaat | G05D 1/0221 |
| 2020/0174481 A1* | 6/2020 | Van Heukelom | G05D 1/0088 |
| 2020/0410751 A1* | 12/2020 | Omari | G06N 3/088 |

FOREIGN PATENT DOCUMENTS

| | | |
|---|---|---|
| JP | 2015143966 A | 8/2015 |
| KR | 10-2011-0026776 A | 3/2011 |
| KR | 10-1096592 B1 | 12/2011 |
| KR | 20160048530 A | 5/2016 |
| WO | 2015185846 A1 | 12/2015 |
| WO | 2016156236 A1 | 10/2016 |

OTHER PUBLICATIONS

"Notice of Preliminary Rejection for Korean Patent Application No. 10-2020-7011812 dated Apr. 6, 2021", KIPO.

"The Extended European Search Report for EP Application No. 18869611.6 dated Apr. 9, 2021", EPO/Munich, Germany.

Tay, et al. "The Bayesian Occupation Filter", Internet Citation, Jul. 11, 2008, pp. 80-101, URL:http://hal.inria.fr/inria-00295084/fr/ retrieved on Aug. 1, 2010.

* cited by examiner

PEDESTRIAN BEHAVIOR PREDICTIONS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

In order to determine how to maneuver a driverless vehicle through an environment with other independent actors such as vehicles, bicycles and pedestrians, it is critical for the driverless vehicle's computing devices to detect such actors and also make predictions about the future motion of those actors. Typical prediction systems may use learned trajectory proposal based behavior models to evaluate the likelihood that an object will follow a given trajectory based on previously observed motion. Some trajectory models may even take into account the relative positions and movements of other actors when making such predictions. When the quality of data from the vehicle's perception system is high and the number of feasible paths for a given actor is relatively small, this trajectory modeling can be a practical and useful approach.

BRIEF SUMMARY

One aspect of the disclosure provides a method controlling a vehicle having an autonomous driving mode. The method includes receiving, by one or more processors of the vehicle, sensor data identifying an object in an environment of the vehicle; projecting, by the one or more processors, a grid including a plurality of cells around the object; for each given one of the plurality of cells, predicting, by the one or more processors, a likelihood that the object will enter the given one within a period of time into the future; generating, by the one or more processors, a contour based on the predicted likelihoods; and controlling, by the one or more processors, the vehicle in the autonomous driving mode in order to avoid an area within the contour.

In one example, the sensor data identifies the object as being a pedestrian object type, and projecting the grid is further based on the pedestrian object type. In another example, the method also includes comprising selecting a point on the object, and projecting the grid includes placing the point at a center of the grid. In another example, the method also includes providing a buffer distance around the contour, and controlling the vehicle includes avoiding an area within the buffer distance around the contour. In another example, the period of time is 2 seconds or less. In another example, the method also includes discarding cells of the plurality of cells using a threshold value and the predicted likelihoods, and the contour is generated using any remaining cells of the plurality of cells. In this example, the method also includes selecting the threshold value based on objects identified in the sensor data. In this example, selecting the threshold value is based on a number of pedestrians identified in the sensor data. In addition or alternatively, selecting the threshold value is based feasibility of the vehicle avoiding the area of the grid. In another example, predicting the predicted likelihoods provides a heat map.

Another aspect of the disclosure provides a system for controlling a vehicle having an autonomous driving mode, The system includes one or more processors configured to: receive sensor data identifying an object in an environment of the vehicle; project a grid including a plurality of cells around the object; for each given one of the plurality of cells, predict a likelihood that the object will enter the given one within a period of time into the future; generate a contour based on the predicted likelihoods; and control the vehicle in the autonomous driving mode in order to avoid an area within the contour.

In one example, the sensor data identifies the object as being a pedestrian object type, and projecting the grid is further based on the pedestrian object type. In another example, the method also includes selecting a point on the object, and projecting the grid includes placing the point at a center of the grid. In this example, the method also includes providing a buffer distance around the contour, and controlling the vehicle includes avoiding an area within the buffer distance around the contour. In another example, the method also includes discarding cells of the plurality of cells using a threshold value and the predicted likelihoods, and the contour is generated using any remaining cells of the plurality of cells. In this example, the method also includes selecting the threshold value based on objects identified in the sensor data. In this example, selecting the threshold value is based on a number of pedestrians identified in the sensor data. In addition or alternatively, selecting the threshold value is based on whether a wheelchair is identified in the sensor data. In another example, predicting the predicted likelihoods provides a heat map. In another example, the system also includes the vehicle.

DETAILED DESCRIPTION

Overview

Figure 1:
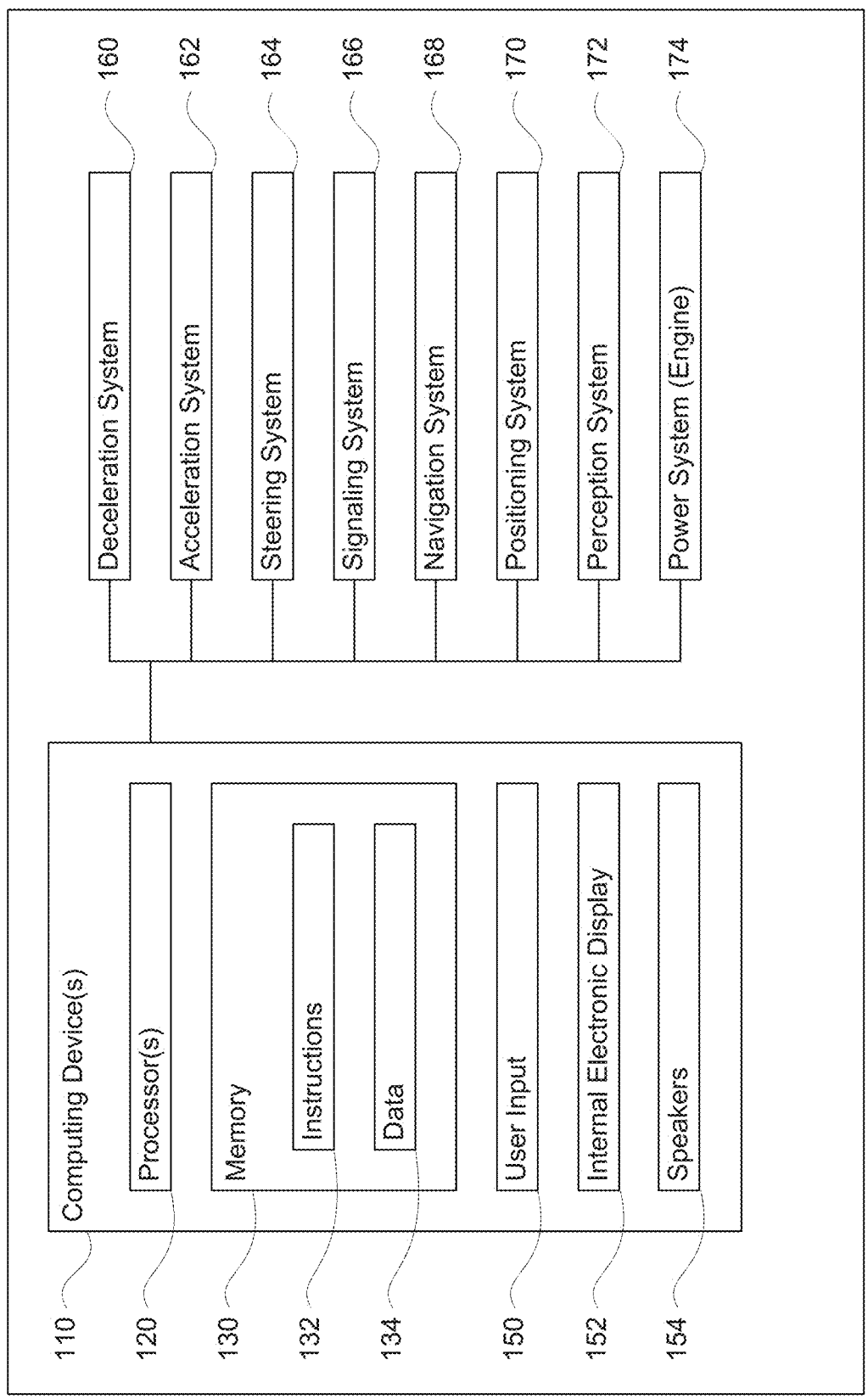
FIG. 1 is a functional diagram of an example vehicle in accordance with aspects of the disclosure.

As noted above, when the quality of data from the vehicle's perception system is high and the number of feasible paths for a given actor is relatively small, this trajectory modeling can be a practical and useful approach. However, in some instances, the quality of data may be less than optimal and the agent's behavior difficult to predict. This is especially true in the case of pedestrians who are infinitely diverse, non-rigid, frequently partially occluded, have the ability to change direction quickly, and traverse all types of terrain. This can make pedestrians difficult to detect, classify, track and especially predict using trajectory modeling.

In order to address these obstacles, instead of or in addition to the trajectory modeling predictions, a grid-based prediction of possible future locations of a pedestrian over a brief period of time into the future may be used. For instance, for every pedestrian detected by the vehicle's perception system, a grid may be projected around the pedestrian. The size of the grid may correspond to an outward boundary for how far a pedestrian would be able to move within the brief period of time.

The grid may be projected such that any point or a given point on the pedestrian is at a center of the grid. Using the observed speed of the pedestrian, direction of movement, and orientation, a value may be determined for each cell indicating how likely the pedestrian could move into that cell over the brief period of time. In some instances, the predictions may also be based on environmental factors.

Accordingly, each grid cell will represent a probability that a pedestrian will move into that cell over the brief period of time. In this regard, the grid may be considered a heat map identifying areas the pedestrian is more or less likely to be over the brief period of time. The heat map may help propagate perception uncertainty into a form that can be used for path planning.

If the probability is high that a pedestrian will not enter a given cell, that cell may be discarded. In other words, cells that do not meet a threshold value may be discarded. A contour may be drawn around the remaining grid cells. This contour may then be used for path planning.

In addition to the benefits discussed above and below, using this grid-based prediction allows a vehicle to be more cautious when responding to pedestrians or in any situation where a vehicle's perception system is unable to reliably identify a type of an object. This form of prediction can also allow human observers to identify uncertainty in perception of position, heading, velocity, acceleration, and contour influence expected motion. In effect, the heat maps can be obtained in a fairly straightforward way from a predictive recurrent neural network, whereas proposal-based trajectories are harder to formulate in this way. At the same time, because this grid-based prediction predicts future location and motion of an actor over a very short time horizon, the actual "ground truth" training data required is very small. In other words, the perception system needs to observe an agent for only a few tenths of a second before a reliable prediction can be made.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing devices code on the computing device-readable medium. In that regard, the terms "instructions" and "programs" may be used interchangeably herein. The instructions may be stored in object code format for direct processing by the processor, or in any other computing devices language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing devices having its own processor or central processing unit (CPU), memory, etc. which may interface with the computing devices 110 via a high-bandwidth or other network connection. In some examples, the computing devices may be a user interface computing devices which can communicate with a user's client device. Similarly, the memory may be a hard drive or other storage media located in a housing different from that of computing devices 110. Accordingly, references to a processor or computing devices will be understood to include references to a collection of processors or computing devices or memories that may or may not operate in parallel.

Computing devices 110 may all of the components normally used in connection with a computing devices such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in an external environment of the vehicle), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing devices 110, in actuality, these systems may also be incorporated into computing devices 110, again as an autonomous driving computing system for controlling vehicle 100.

The computing devices 110 may control the direction and speed of the vehicle by controlling various components. By way of example, computing devices 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Figure 2:
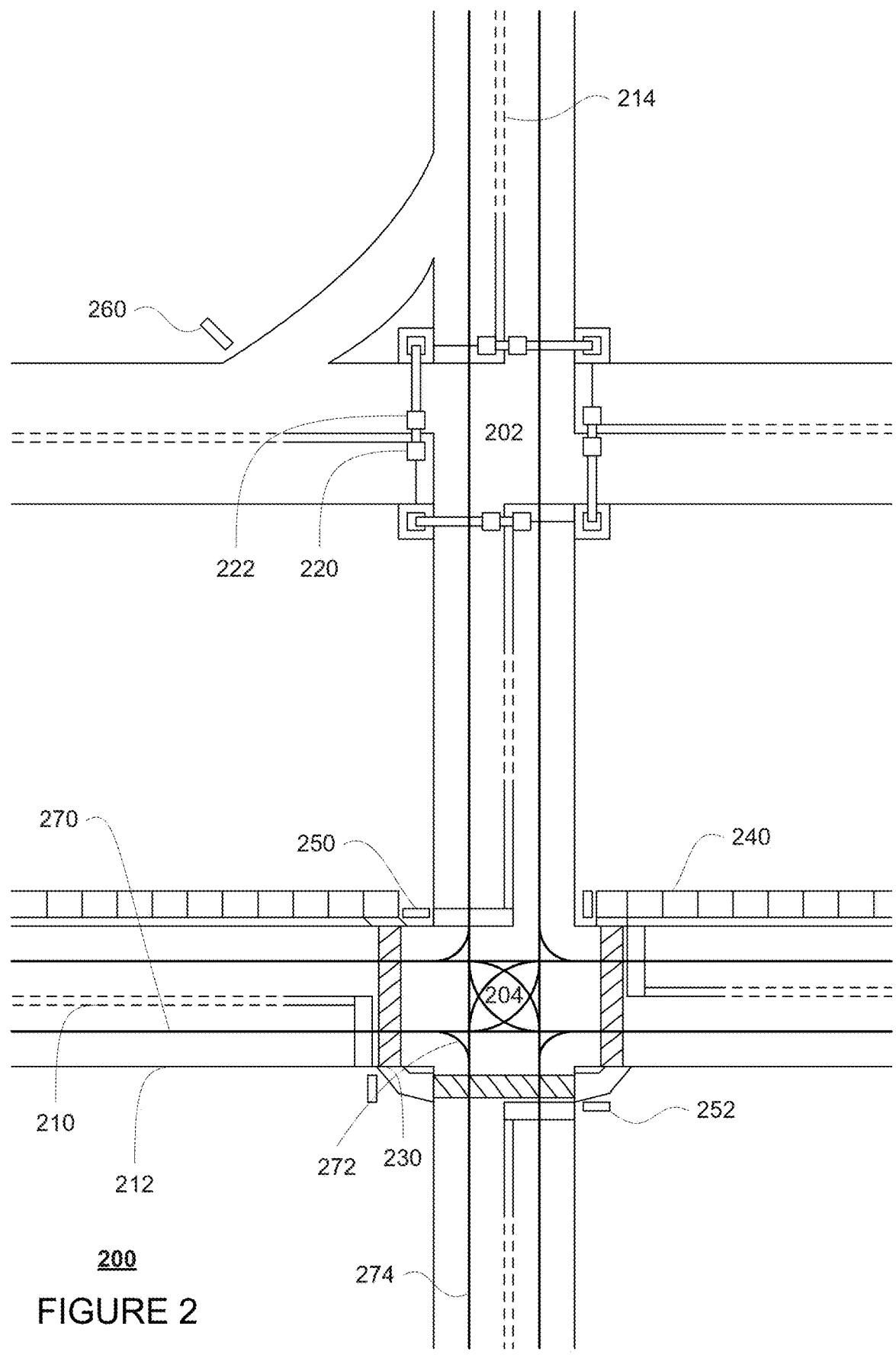
FIG. 2 is an example representation of detailed map information in accordance with aspects of the disclosure.
Figure 3A:
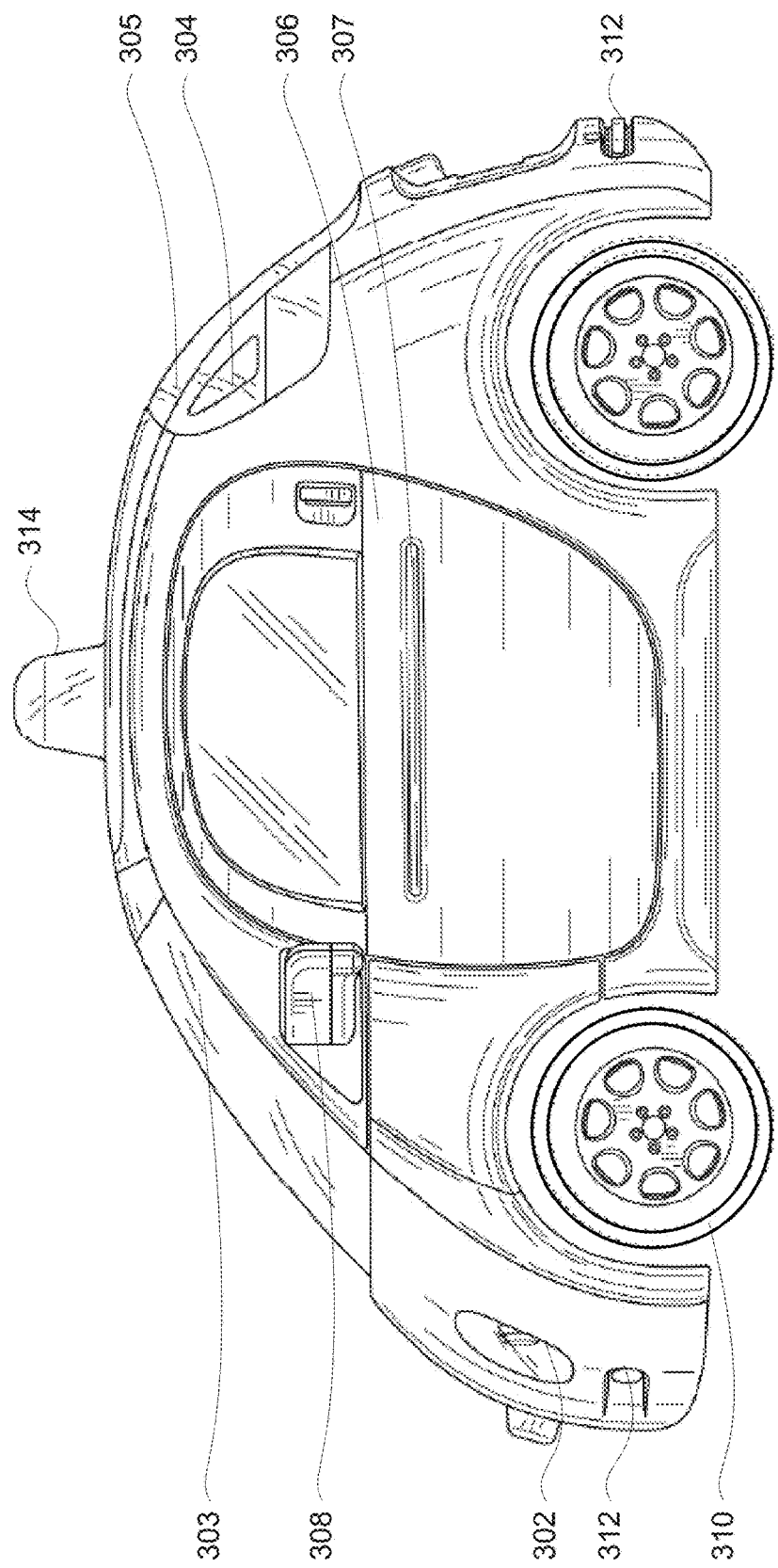
FIGS. 3A-3D are example external views of a vehicle in accordance with aspects of the disclosure.
Figures 3B, 3C:
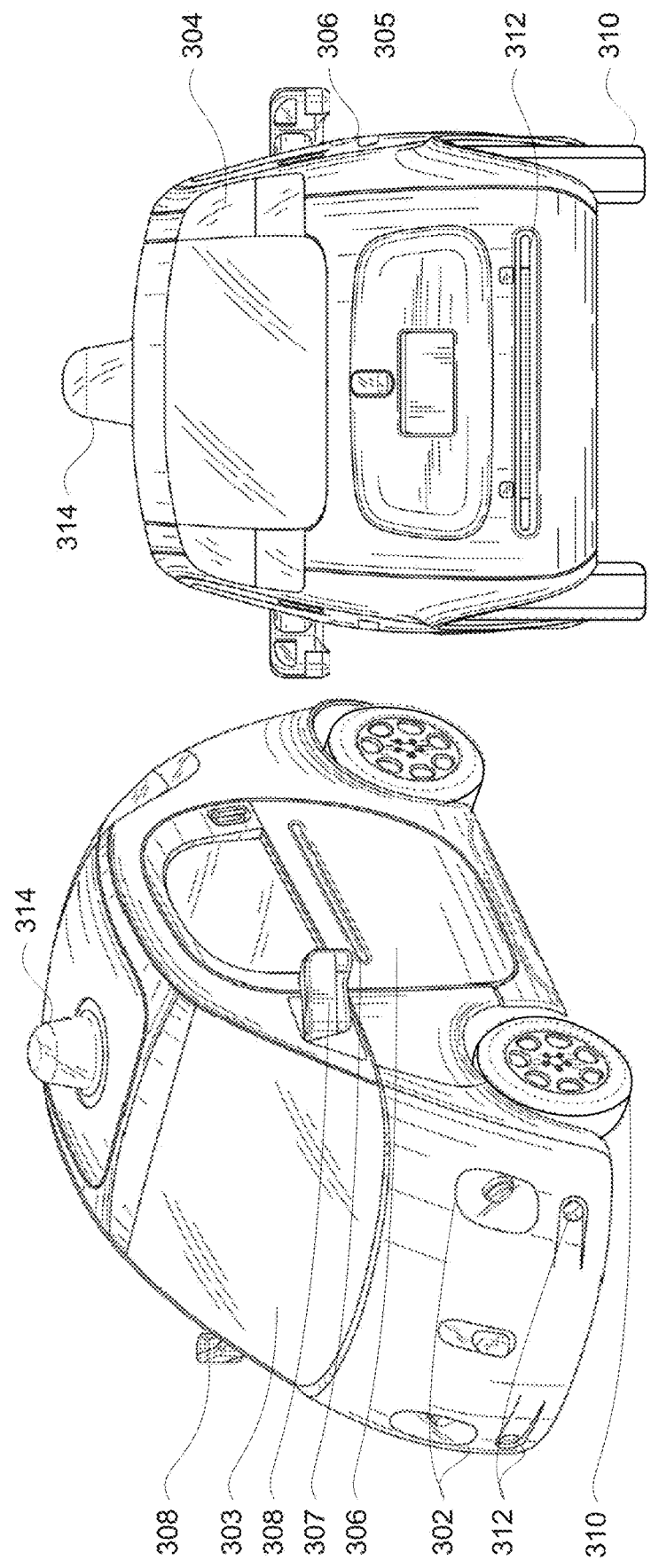
Figure 3D:
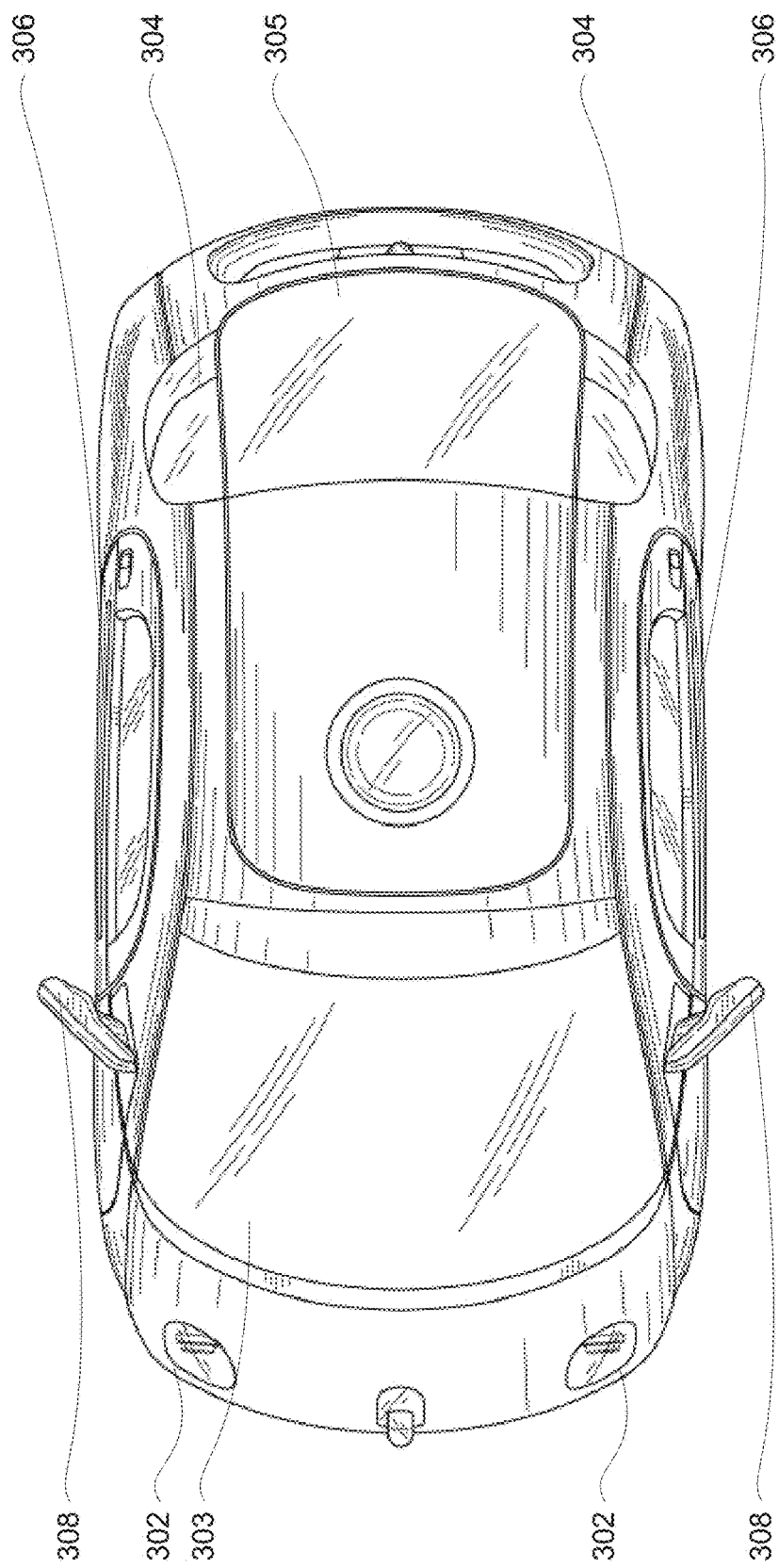

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record sensor data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent as sensor data for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Computing devices 110 may maneuver vehicle 100 to a destination location, for instance, to transport cargo and/or one or more passengers. In this regard, computing devices 110 may initiate the necessary systems to control the vehicle autonomously along a route to the destination location. For instance, the navigation system 168 may use the map information of data 134 to determine a path or route to the destination location that follows a set of connected rails of map information 200. The computing devices 110 may then maneuver the vehicle autonomously (or in an autonomous driving mode) as described above along the route towards the destination.

Figure 4:
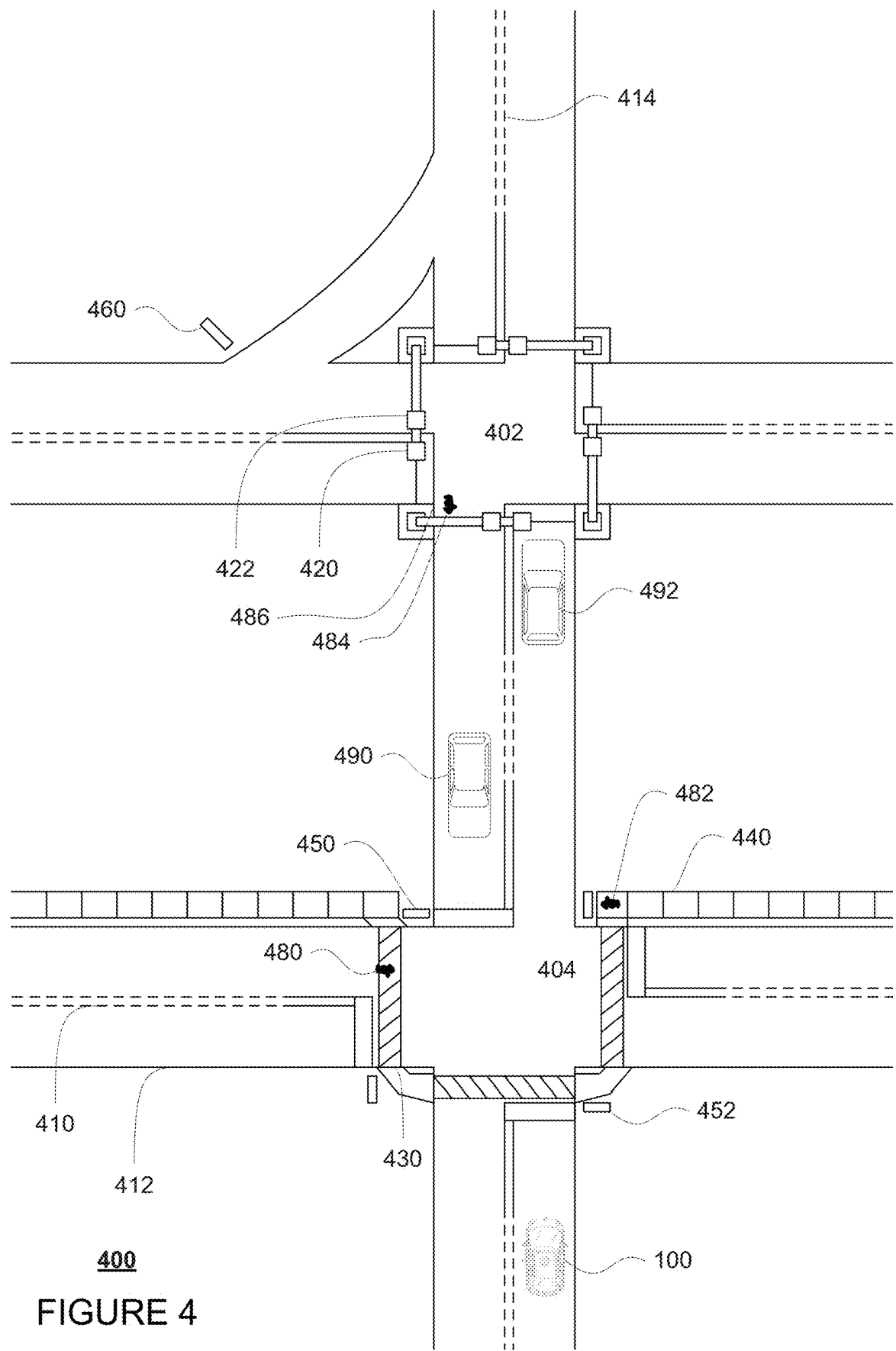
FIG. 4 is a view of a section of roadway in accordance with aspects of the disclosure.

For instance, FIG. 4 depicts vehicle 100 being maneuvered on a section of roadway 400 including intersections 402 and 404 corresponding to the map information 200. In this example, intersections 402 and 404 correspond to intersections 202 and 204 of the map information 200, respectively. In this example, lane lines 410, 412, and 414 correspond to the shape, location, and other characteristics of lane lines 210, 212, and 214, respectively. Similarly, crosswalk 430 corresponds to the shape, location, and other characteristics of crosswalk 230, respectively; sidewalks 440 correspond to sidewalks 240; traffic signal lights 420, 422 correspond to traffic signal lights 220, 222, respectively; stop signs 450, 452 correspond to stop signs 250, 252, respectively; and yield sign 460 corresponds to yield sign 260. In addition, various pedestrians 480-484 and vehicles 490, 492 are arranged at different locations around roadway 400.

Figure 5:
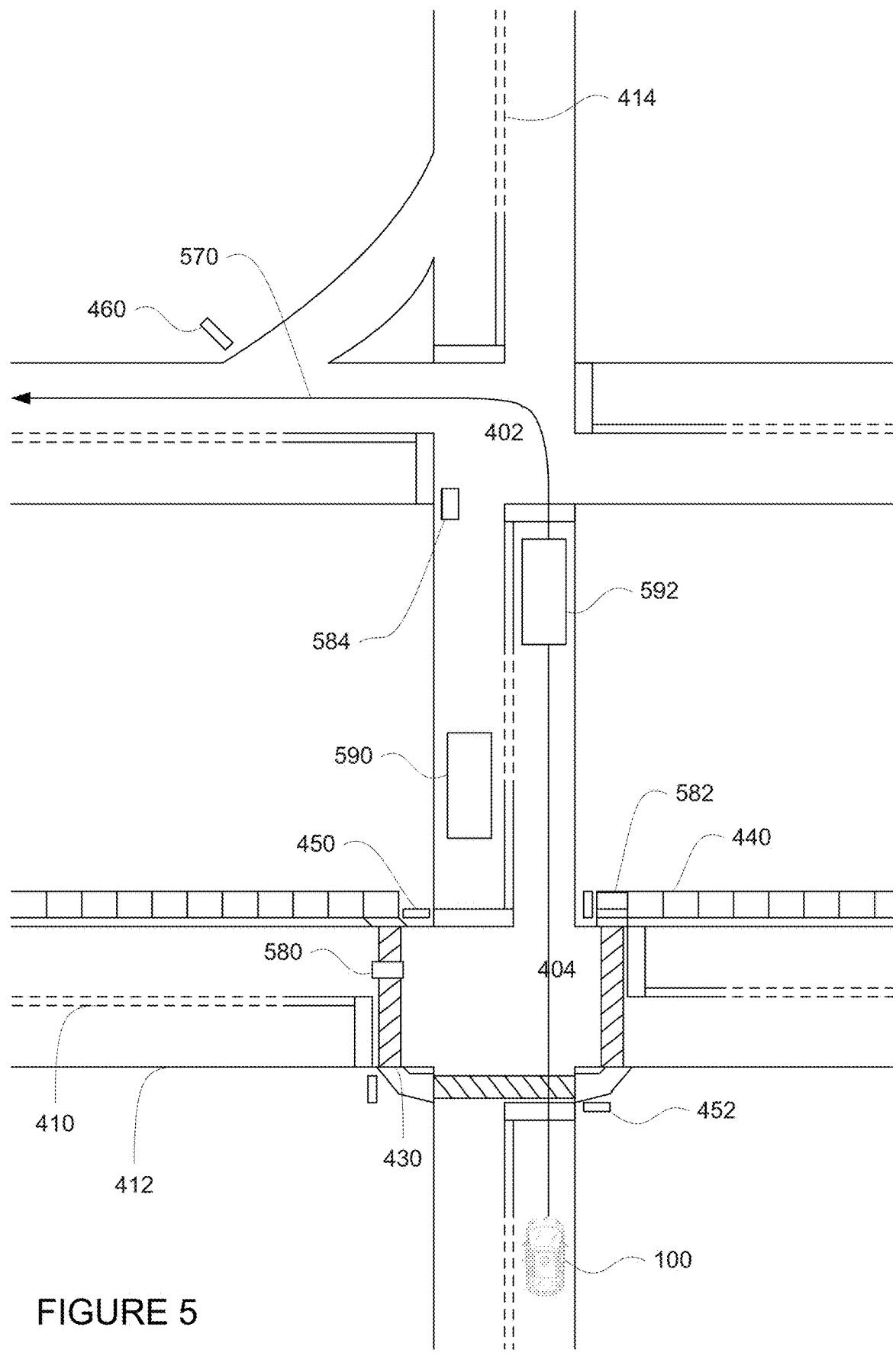
FIG. 5 is a view of a section of roadway and sensor data in accordance with aspects of the disclosure.

As the vehicle 100 moves through its environment, the vehicle's perception system 172 may provide the computing devices 110 with sensor data including information about the vehicle's environment. As noted above, this sensor data may include the location, heading, speed, type and other characteristics such as the characteristics of features of the map information as well as other "road users" including objects such as vehicles, pedestrians and bicyclists. For instance, FIG. 5 depicts features of the environment of vehicle 100 of FIG. 4 (traffic signal lights being removed for ease of understanding) with bounding boxes 580, 582 and 590, 592 representing the general shape and location of pedestrians 480-484 and vehicles 490, 492 as provided to the computing devices 110 by perception system 172. In this example, the navigation system 168 use map information 200 to determine a route 570 for vehicle 100 to follow in order to reach a destination (not shown), and as discussed further the computing devices 110 may determine a trajectory for the vehicle to track over the next few seconds in order to follow the route.

For each of the objects corresponding to other road users, the computing devices 110 may predict a future behavior of that object. As noted above, this may include estimating a future trajectory for that object which describes a series of predicted future locations connected together to form a geometry of the trajectory based on the previous observations of the object's position, orientation, speed, change in position, change in orientation, signals (turn signals), etc. contextual information such as status of traffic signal lights, location of stop signs, speed limits, traffic rules (one way streets, turn-only lanes, etc.), and other information, as well as predictive behavior models for the object. As an example only, arrows 680-684 and 690, 692 represent estimated trajectories for pedestrians 480-484 and vehicles 490, 492 which may indicate a most likely path these other road users are likely to take over a period of time into the future, such as 2 seconds or more or less.

Figure 7A:
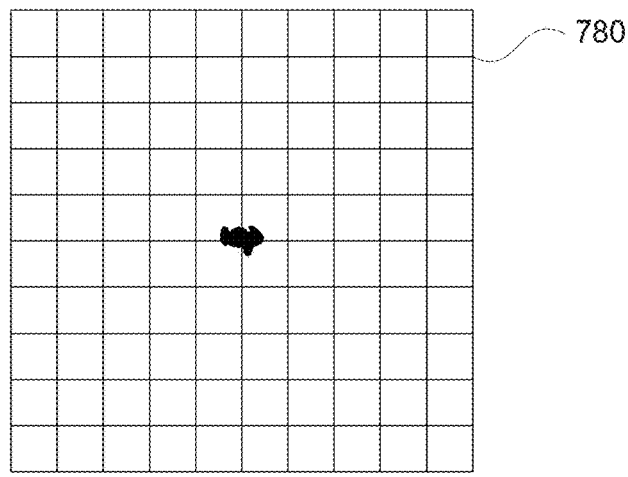
FIGS. 7A-7C are example grid projections in accordance with aspects of the disclosure.
Figure 7B:
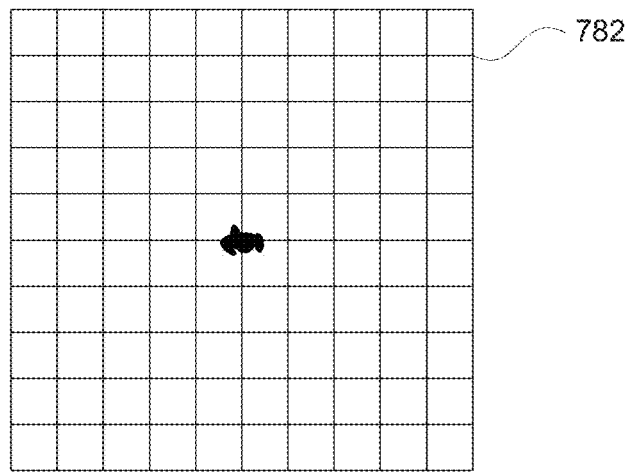
Figure 7C:
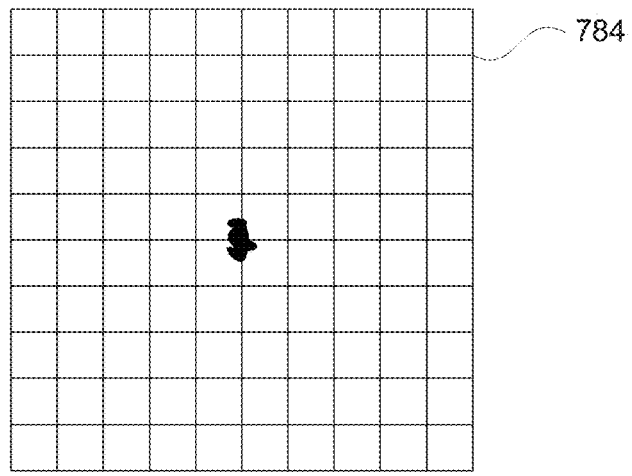
Figure 8:
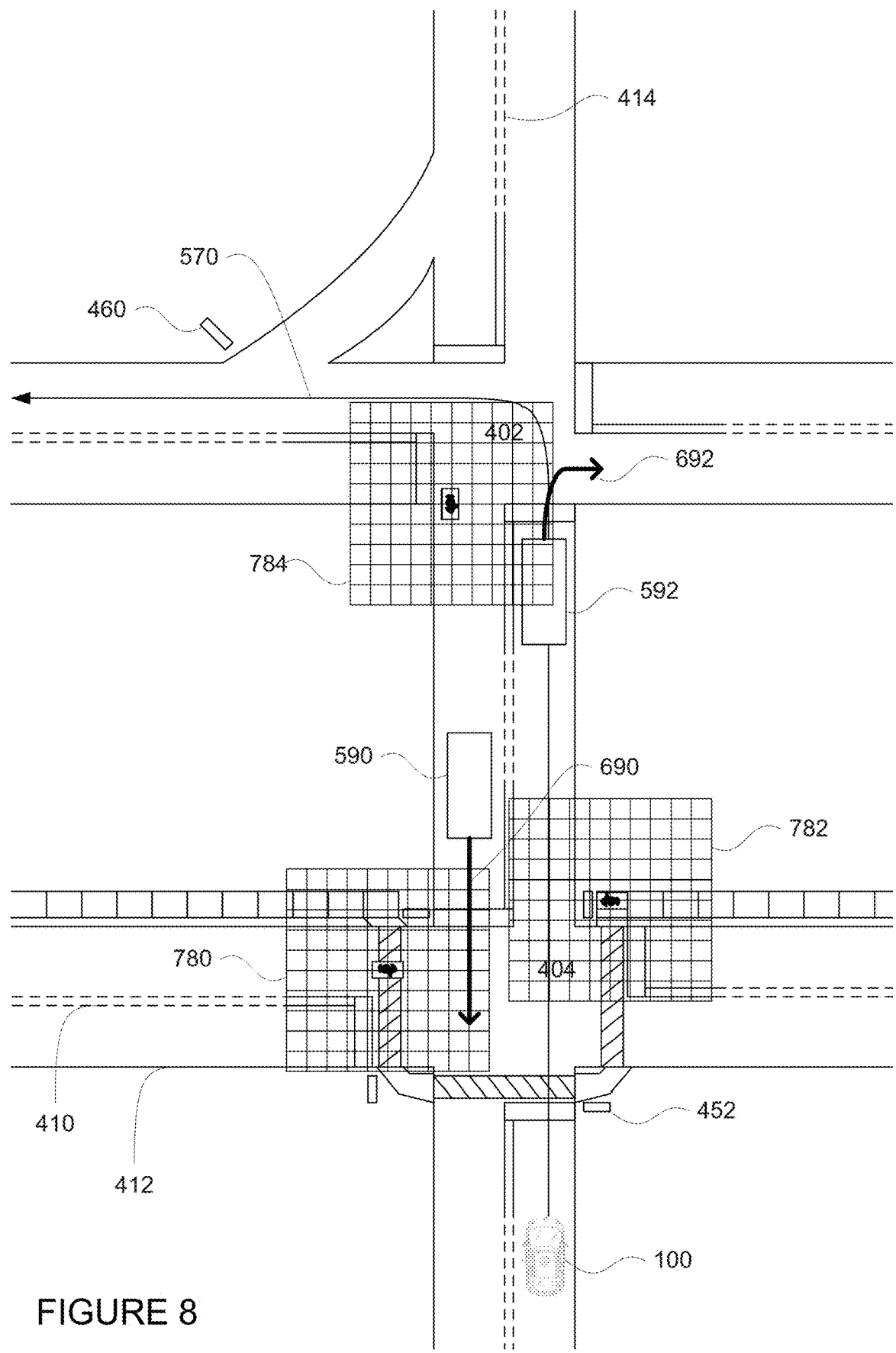
FIG. 8 is a view of a section of roadway, sensor data, predicted trajectories, and grid projections in accordance with aspects of the disclosure.

For the other road user objects corresponding to a pedestrian object type or simply pedestrians, instead of or in addition to the trajectory modeling predictions, a grid-based prediction of possible future locations of a pedestrian over a brief period of time into the future may be used. For instance, for every pedestrian detected by the vehicle's perception system, a grid may be projected around the pedestrian. For instance, a grid may be predicted for each of pedestrians 480-484. FIG. 7A is an example grid projection 780 for pedestrian 480, FIG. 7B is an example grid projection 782 for pedestrian 482, and FIG. 7C is an example grid projection 784 for pedestrian 484. FIG. 8 depicts these grid projections overlaid onto the example of FIG. 5 for reference purposes.

The size of the grid may correspond to an outward boundary for how far a pedestrian would be able to move within a period of time into the future. For instance, if the period of time is 2 seconds or less, such as 1.5 seconds, the grid may be 5 meters by 5 meters with 0.5 meter cells. Of course, the size selection may be larger or smaller as needed to address tradeoffs between computation resources (time and effort) and prediction precision. In some instances, the grid size may be increased if a pedestrian is moving very fast.

Figure 6:
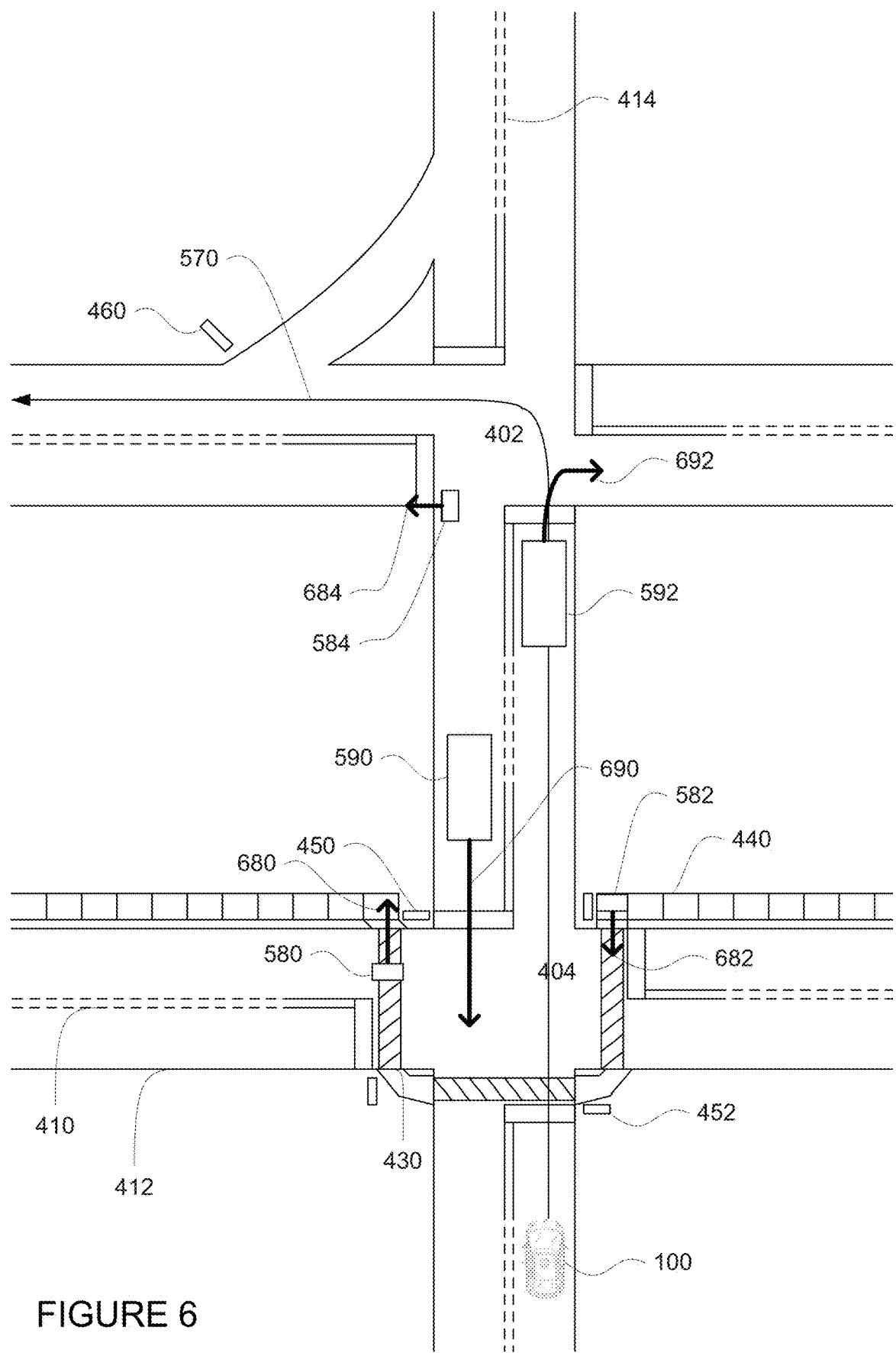
FIG. 6 is a view of a section of roadway, sensor data, and predicted trajectories in accordance with aspects of the disclosure.

As shown in FIGS. 6A and 6B, the grid may be projected such that any point or a given point on the pedestrian is at a center of the grid. As an example given point may be an estimated center of gravity, a point on a torso, a point on the pedestrian's head, etc.

Using the observed speed of the pedestrian, direction of movement, and orientation, a value may be determined for each cell indicating how likely the pedestrian could move into that cell over the brief period of time. For instance, the pedestrian may be more likely to move forward and cover grid cells to the front left or right than grid cells behind the pedestrian (which would require the pedestrian to change direction by 180 degrees).

In some instances, the predictions may also be based on environmental factors. Thse may include, for instance, a distance between the pedestrian and other roadgraph feature or features (such as an intersection, crosswalk, road curb, median, stop sign, construction zone, etc.), a difference between the heading of the pedestrian and a shortest path to reach the roadgraph feature or features (for instance, this may include measurements indicating whether the pedestrian is facing the roadgraph feature or features), whether an area of a cell is in or occupying the roadgraph feature or features, a distance between the pedestrian and any surrounding objects such as vehicles or other larger obstacles, whether a cell is currently occupied by some other object such as a vehicle, pedestrian, bicyclist, debris, or other object, etc.

As an example, where a pedestrian is located relative to a roadway may make it more or less likely for the pedestrian to enter certain cells. For instance, if the pedestrian is exiting the roadway, it would be unlikely that he or she would change direction and move back into the roadway (making the cells behind the pedestrian even less likely). In this regard, pedestrians 480 and 484 are moving towards the edge of a crosswalk and roadway, respectively. Thus, they may be more likely to continue to do so than to change direction. Moreover as pedestrian 484 is not in a crosswalk, pedestrian 484 may tend to move faster through the intersection 402 than pedestrian 480 as pedestrian 480 is in a crosswalk. Similarly, if a pedestrian is approaching an edge of the roadway, such as pedestrian 482 who is approaching road edge 486 (shown in FIG. 4), it is likely that he or she may slow down rather than continuing at a current speed. As such, it would be less likely that the pedestrian 482 would reach grid cells more than a meter or so in front of the pedestrian over the brief period.

Figure 9A:
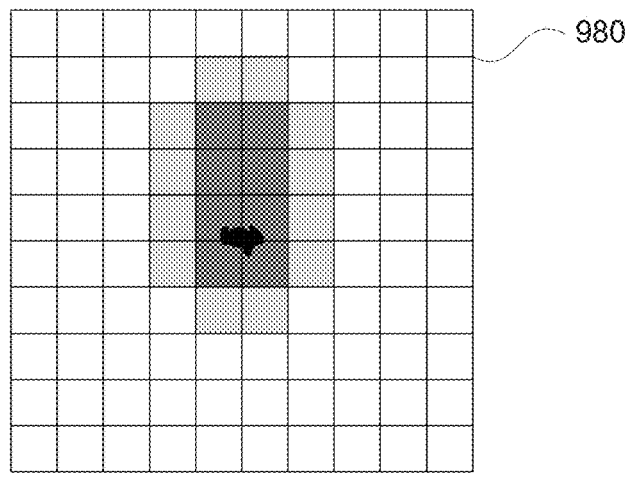
FIGS. 9A-9C are example probability distributions in accordance with aspects of the disclosure.
Figure 9B:
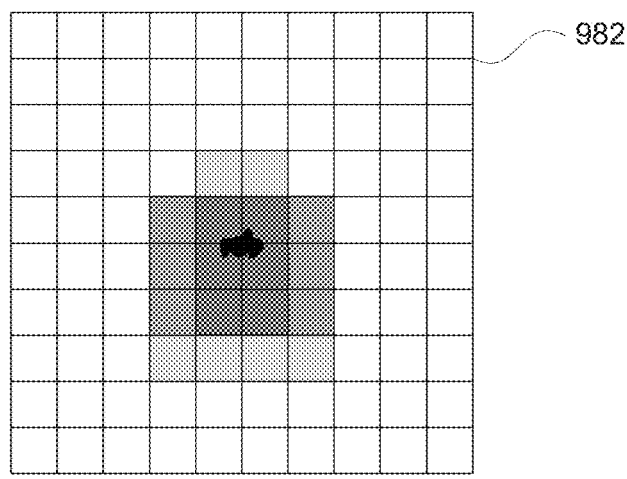
Figure 9C:
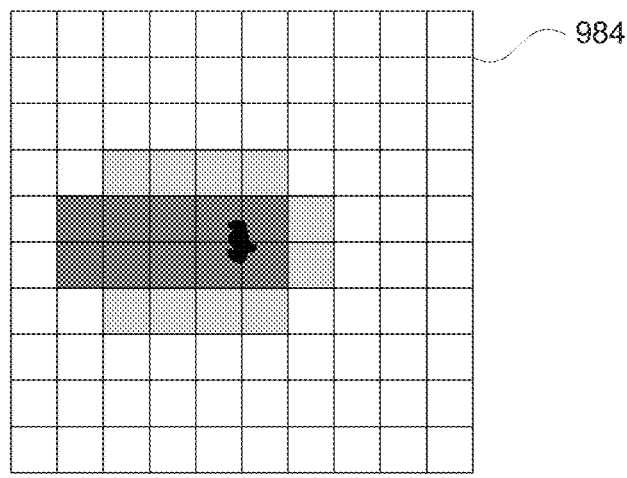

Each grid cell will therefore represent a probability that a pedestrian will move into that cell over the brief period of time. FIGS. 9A-9C depict example probability distributions 980-984 for each of grid projections 780-784 of FIGS. 7A-7C, respectively. A top-down view of these grids provides a heat map with areas having higher likelihoods (e.g. darker shaded areas) that a pedestrian will traverse grid cells close to the pedestrian and decaying in likelihood (and in shading) moving outward from the pedestrian based on the predictions.

Figure 10A:
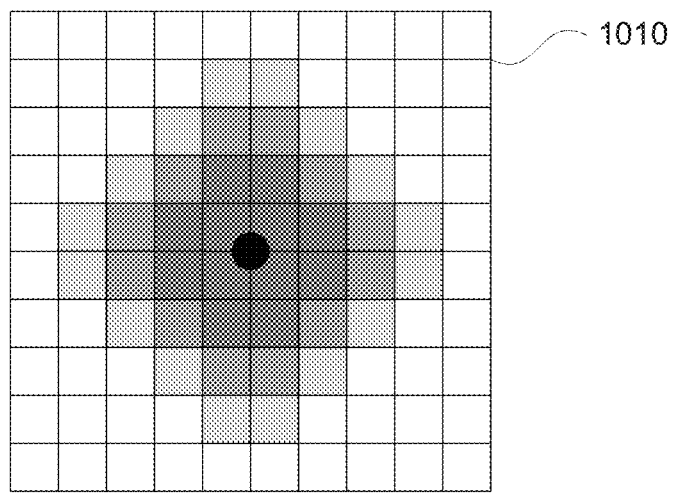
FIGS. 10A-10B are example probability distributions in accordance with aspects of the disclosure.
Figure 10B:
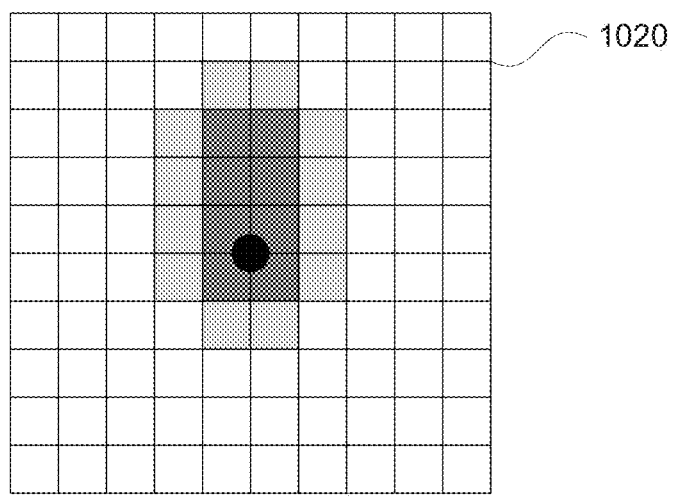
Figure 11A:
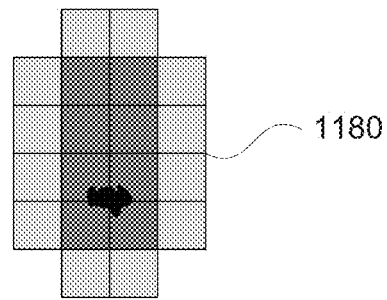
FIGS. 11A-11C are example filtered probability distributions in accordance with aspects of the disclosure.
Figure 11B:
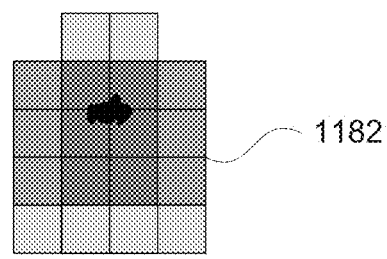
Figure 11C:
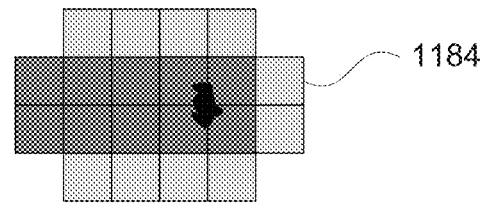

In one example, if the vehicle's computing devices are not confident (or not confident enough) about which way a pedestrian is facing, the resulting heat map may be more uniform in all directions around the pedestrian such as in the example of grid projection 1010 of FIG. 10A. In another example, if the vehicle's computing devices are very confident that the pedestrian is facing forward, the result would be a much more directed heat map such as in the example of grid projection 1020 of FIG. 10B. In this regard, the heat map may help propagate perception uncertainty into a form that can be used for path planning as discussed further below.

If the probability is high that a pedestrian will not enter a given cell, that cell may be discarded or filtered. In other words, cells that do not meet a threshold value or a particular confidence threshold value may be discarded. As an example, a cell having a 95% probability of being unoccupied or 5% probability of being occupied may be discarded. Returning to the examples of FIGS. 9A-9C, FIGS. 11A-11C depict filtered probability distributions 1180-1184 corresponding to probability distributions 980-984 with cells having low probabilities (empty or non-shaded cells) removed.

The threshold value may be adjusted based on the circumstances. For instance, if is at least a predetermined number of pedestrians in the area, whether there are any children, whether there are any people with wheelchairs, etc., the threshold value may be increased or decreased to increase the cautiousness of the vehicle. For instance, the threshold value may be adjusted from 95% to 98% or decreased from 5% to 2% depending on the type of threshold value. As another example, another object's "right of way" may be used to adjust the threshold. For instance, the vehicle may be more cautious, or use a higher threshold, when a pedestrian is located within a crosswalk than when a pedestrian is in a sidewalk. As yet another example, whether it is feasible to avoid cells of a grid may be used to adjust the threshold. For instance, if it is not kinematically feasible to swerve or brake to avoid all of the cells, the threshold may be decreased in order to be able to plan a feasible trajectory that is still safe for the vehicle and the pedestrian. In other words, there may be situations where if the vehicle took a very conservative approach and used a high threshold, the vehicle would be unable to swerve or brake in time to totally avoid collision with some of the low likelihood cells. However, the vehicle is likely able to avoid passing through the area of cells with slightly higher likelihoods. Thus, the threshold may be adjusted from a very conservative, higher threshold, to a lower threshold while still remaining safe in a practical sense) in order to make the threshold feasible to satisfy. In this regard, the grid-based predictions can be even more dynamic and responsive to changing circumstances.

Figure 12A:
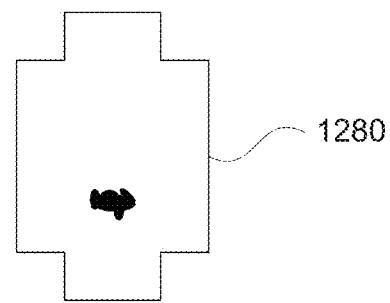
FIGS. 12A-12C are example contour areas in accordance with aspects of the disclosure.
Figure 12B:
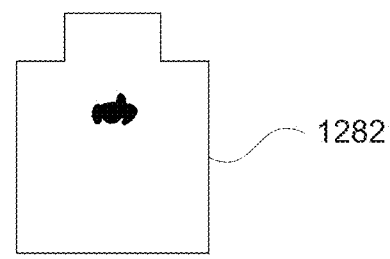
Figure 12C:
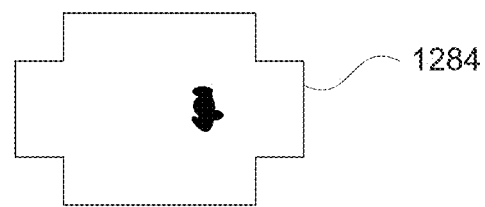

A contour may be drawn around the remaining grid cells. FIGS. 12A-12C are example contour areas 1280-1284 for the probability distributions 1180-1184. These contours may be used by the computing devices for path planning. For example, the path planning involves using the contour to define an area through which the vehicle is not permitted to pass during the brief period of time.

Figure 13:
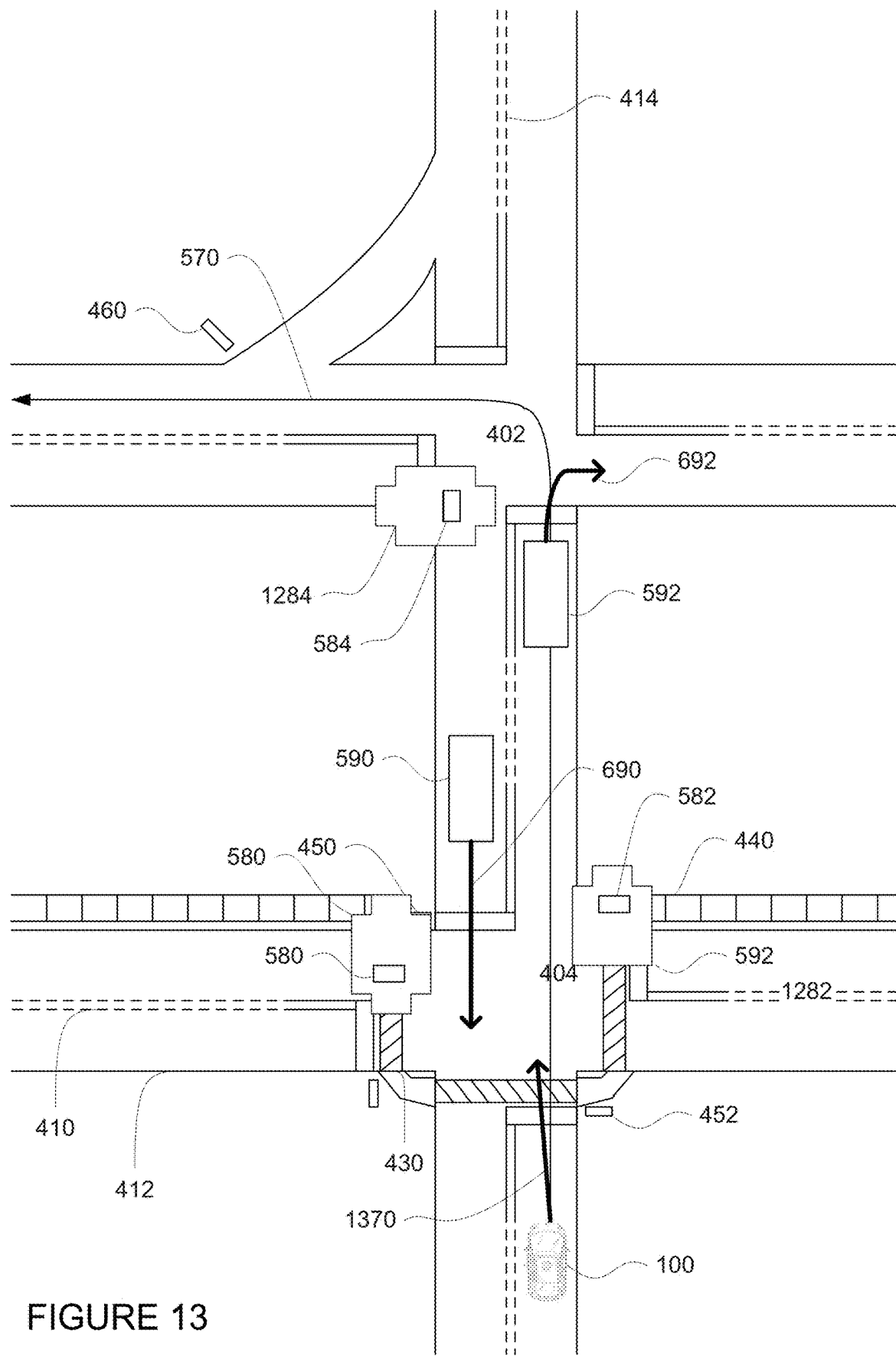
FIG. 13 is a view of a section of roadway, sensor data, predicted trajectories, and contour areas in accordance with aspects of the disclosure.

The computing devices 110 may generate a trajectory which avoids any of these contour areas. For example, FIG. 13 depicts the example of FIG. 6 with the example contour areas 1280-1284. In this example, computing devices 110 may generate a trajectory 1370 that adjusts the vehicle's position and slows the vehicle down in order to avoid the contour area 1282 as well as trajectory 694 of vehicle 494 while still following route 570.

In some instances, a buffer distance or area around the contour may also be imposed to ensure that the vehicle does not come too close to the pedestrian. For instance, this number may be selected to ensure a "comfortable" passing margin for the pedestrian as well as a passenger, such as 1 meter or more or less.

In addition, because the resulting contours represent a short time horizon, the contour can be used in a time-independent way (e.g. treated like a static object) for path planning, which makes avoiding a pedestrian an easier problem than if the pedestrian were considered to be a moving object. In this regard, when determining the vehicle's trajectory for the period of time, the computing devices 110 may simply treat each of the contour areas 1280-1284 as individual larger stationary object that the computing devices 110 must avoid.

Figure 14:
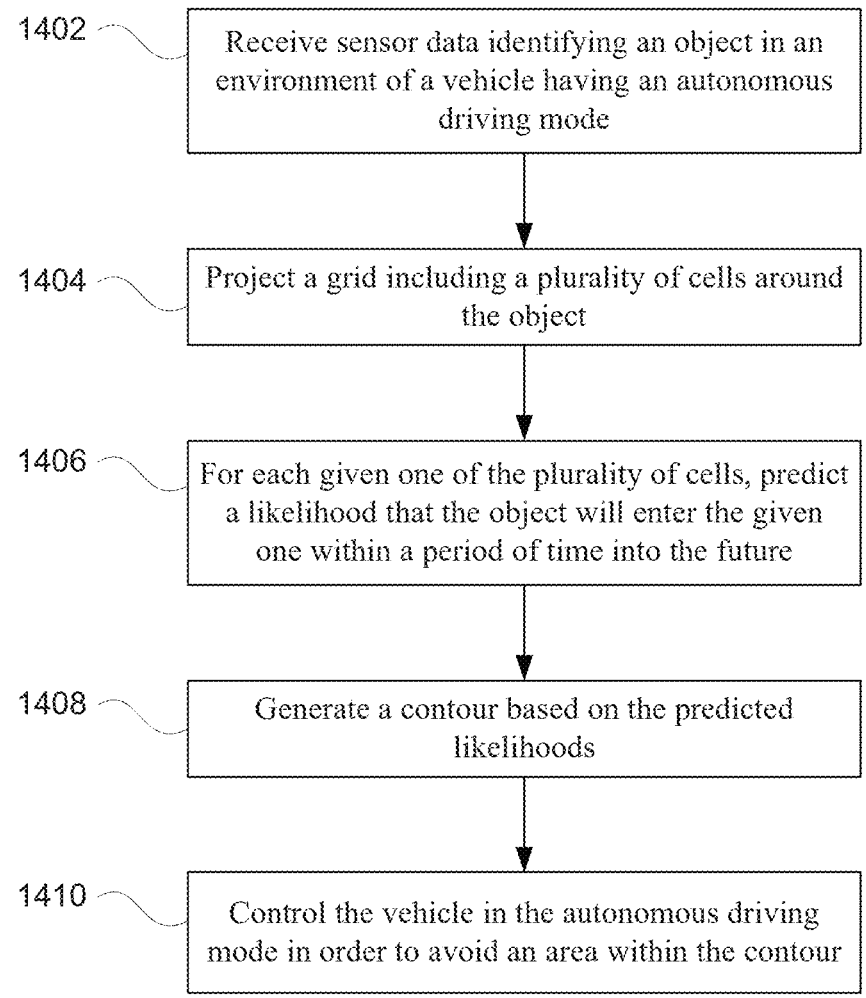
FIG. 14 is a flow diagram in accordance with aspects of the disclosure.

FIG. 14 is a flow diagram 1400 that may be performed by one or more processors, such as one or more processors 120 of computing devices 110 in order to control a vehicle in an autonomous driving mode. In this example, at block 1402, sensor data identifying an object in an environment of the vehicle is received. At block 1404, a grid including a plurality of cells is projected around the object. At block 1406, For each given one of the plurality of cells, a likelihood that the object will enter the given one within a period of time into the future is predicted. At block 1408, a contour is generated based on the predicted likelihoods. At block 1410, the vehicle is then controlled in the autonomous driving mode in order to avoid an area within the contour.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific

The invention claimed is:

1. A method of controlling a vehicle having an autonomous driving mode, the method comprising:
   receiving, by one or more processors of the vehicle, sensor data identifying an object in an environment of the vehicle;
   determining, by the one or more processors, a size of a grid including a plurality of cells around the object based on how far the object would be able to move within a first period of time into the future;
   projecting, by the one or more processors, the grid having the determined size around the object;
   for each cell of the plurality of cells included in the grid, predicting, by the one or more processors, a likelihood that the object will enter the cell within a second period of time into the future;
   generating, by the one or more processors, a contour based on the predicted likelihoods that the object will enter the cells; and
   controlling, by the one or more processors, the vehicle in the autonomous driving mode in order to avoid an area within the contour that was generated based on the predicted likelihoods that the object will enter the cells.

2. The method of claim 1, wherein the sensor data identifies the object as being a pedestrian, and projecting the grid is further based on the object being the pedestrian.

3. The method of claim 1, further comprising selecting a point on the object, and wherein projecting the grid includes placing the point at a center of the grid.

4. The method of claim 1, further comprising providing a buffer distance around the contour, and wherein controlling the vehicle includes avoiding an area within the buffer distance around the contour.

5. The method of claim 1, wherein at least one of the first period of time or the second period of time is 2 seconds or less.

6. The method of claim 1, further comprising discarding cells of the plurality of cells using a threshold value and the predicted likelihoods, and wherein the contour is generated using any remaining cells of the plurality of cells.

7. The method of claim 6, further comprising selecting the threshold value based on objects identified in the sensor data.

8. The method of claim 7, wherein selecting the threshold value is based on a number of pedestrians identified in the sensor data.

9. The method of claim 7, wherein selecting the threshold value is based feasibility of the vehicle avoiding the area of the grid.

10. The method of claim 1, wherein predicting the predicted likelihoods provides a heat map.

11. A system for controlling a vehicle having an autonomous driving mode, the system comprising one or more processors configured to:
   receive sensor data identifying an object in an environment of the vehicle;
   determine a size of a grid including a plurality of cells around the object based on how far the object would be able to move within a first period of time into the future;
   project the grid having the determined size around the object;
   for each cell of the plurality of cells included in the grid, predict a likelihood that the object will enter the cell within a second period of time into the future;
   generate a contour based on the predicted likelihoods that the object will enter the cells; and
   control the vehicle in the autonomous driving mode in order to avoid an area within the contour that was generated based on the predicted likelihoods that the object will enter the cells.

12. The system of claim 11, wherein the sensor data identifies the object as being a pedestrian, and projecting the grid is further based on the object being the pedestrian.

13. The system of claim 11, further comprising selecting a point on the object, and wherein projecting the grid includes placing the point at a center of the grid.

14. The system of claim 11, further comprising providing a buffer distance around the contour, and wherein controlling the vehicle includes avoiding an area within the buffer distance around the contour.

15. The system of claim 11, further comprising discarding cells of the plurality of cells using a threshold value and the predicted likelihoods, and wherein the contour is generated using any remaining cells of the plurality of cells.

16. The system of claim 15, further comprising selecting the threshold value based on objects identified in the sensor data.

17. The system of claim 16, wherein selecting the threshold value is based on a number of pedestrians identified in the sensor data.

18. The system of claim 16, wherein selecting the threshold value is based on whether a wheelchair is identified in the sensor data.

19. The system of claim 11, wherein predicting the predicted likelihoods provides a heat map.

20. The system of claim 11, further comprising the vehicle.

* * * * *